United States Patent
Kurani et al.

(10) Patent No.: US 10,284,883 B2
(45) Date of Patent: May 7, 2019

(54) REAL-TIME DATA UPDATES FROM A RUN DOWN SYSTEM FOR A VIDEO BROADCAST

(71) Applicant: Disney Enterprises, Inc., Burbank, CA (US)

(72) Inventors: Ketan N. Kurani, Monroe Township, NJ (US); Joel R. Fredericks, New York, NY (US); Rabindra Mukraj, Scarsdale, NY (US); Michael J. Strein, Bohemia, NY (US); Timothy M. Larkin, Thornwood, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/283,031

(22) Filed: Sep. 30, 2016

(65) Prior Publication Data
US 2018/0098099 A1 Apr. 5, 2018

(51) Int. Cl.
| | |
|---|---|
| *H04N 21/2187* | (2011.01) |
| *H04N 21/235* | (2011.01) |
| *H04N 21/854* | (2011.01) |
| *H04N 21/4788* | (2011.01) |
| *H04N 21/262* | (2011.01) |
| *H04N 21/2668* | (2011.01) |
| *H04N 21/431* | (2011.01) |

(52) U.S. Cl.
CPC ....... *H04N 21/2187* (2013.01); *H04N 21/235* (2013.01); *H04N 21/2353* (2013.01); *H04N 21/2668* (2013.01); *H04N 21/26291* (2013.01); *H04N 21/4312* (2013.01); *H04N 21/4788* (2013.01); *H04N 21/854* (2013.01)

(58) Field of Classification Search
None
See application file for complete search history.

(56) References Cited

U.S. PATENT DOCUMENTS

| | | | | |
|---|---|---|---|---|
| 2003/0001880 A1* | 1/2003 | Holtz | ............... | G06F 17/30017 715/716 |
| 2005/0223106 A1* | 10/2005 | Ross | ................... | G11B 27/034 709/231 |
| 2007/0044133 A1* | 2/2007 | Hodecker | ......... | H04N 7/17336 725/117 |
| 2010/0248195 A1* | 9/2010 | Fletcher | ................ | G09B 19/04 434/185 |
| 2011/0026898 A1* | 2/2011 | Lussier | ............... | G11B 27/034 386/280 |
| 2015/0113411 A1* | 4/2015 | Underwood | ......... | G06F 3/0484 715/730 |
| 2015/0268922 A1* | 9/2015 | Defouw | .......... | H04N 21/25891 715/716 |

(Continued)

Primary Examiner — Jason K Lin
(74) Attorney, Agent, or Firm — Patterson + Sheridan, LLP

(57) ABSTRACT

Systems, methods, and articles of manufacture to perform an operation comprising providing rundown data for a live video broadcast in a rundown system, transmitting the rundown data to a first device, wherein the rundown data is outputted based on a format template for the first device, determining that the rundown data for the live video broadcast has been modified in the rundown system, transmitting the modified rundown data to the first device, and outputting the modified rundown data via the first device and based on the format template for the first device.

20 Claims, 8 Drawing Sheets

(56) References Cited

U.S. PATENT DOCUMENTS

| | | | |
|---|---|---|---|
| 2015/0288645 A1* | 10/2015 | Gianattasio | H04H 20/22 |
| | | | 709/206 |
| 2016/0093286 A1* | 3/2016 | de Freitas | G10L 13/033 |
| | | | 704/260 |
| 2016/0191350 A1* | 6/2016 | Kaminski, Jr. | H04L 43/062 |
| | | | 705/7.31 |
| 2016/0246860 A1* | 8/2016 | Qian | H04L 67/303 |
| 2016/0247539 A1* | 8/2016 | Hundemer | H04N 7/0884 |
| 2017/0161320 A1* | 6/2017 | Venkataraman | |
| | | | G06F 17/30401 |

\* cited by examiner

PROGRAM
AIR DATE: 6/29/16

| PG | TALENT | SLUG | GFX-EVS | AUDIO | NOTES | TIME | CUMME |
|---|---|---|---|---|---|---|---|
|  |  |  |  |  |  |  | 0:00 |
| A0 |  | TEMPLATE |  |  |  | 0:00 | 0:00 |
|  |  | AIR DATE: 6/29/16 |  |  |  | 0:00 | 0:00 |
|  |  | SHOW # 4287  RATINGS TV 14 DL |  |  |  | 0:00 | 0:00 |
|  |  | START OF SHOW |  |  |  | 0:00 | 0:00 |
|  |  | SEGMENT A / SEGMENT 1 |  |  |  | 0:00 | 0:00 |
|  |  | H BASE (5 - WG, SUNNY, JB, RS, PF) |  |  |  | 0:00 | 0:00 |
| A1 | VH | COLD OPEN | RED | SOT | TRT: 48 OUT: 48 | 0:45 | 0:00 |
|  |  |  |  |  |  | 0:00 | 0:45 |
|  |  | HOST WALK OUT |  | MUSIC | "A MAN'S GOTTA DO" | 0:00 | 0:45 |
| A1A |  | CG: HT/ BUG/ SNIPE 11 & 17 |  |  |  | 0:00 | 0:45 |
|  |  | HOSTS ARRIVE AT TABLE |  |  |  | 0:00 | 0:45 |
|  |  |  |  |  |  | 0:00 | 0:45 |
| A2 | WG | WELCOME |  |  |  | 7:15 | 0:45 |
|  |  |  |  |  |  | 0:00 | 8:00 |
| A3 | WG | HT #1 TURKEY AIRPORT |  |  |  | 0:09 | 8:00 |
| A3A |  | BROLL TURKEY | BLUE | SILENT | TRT: 15 TO A FREEZE | 0:00 | 8:09 |
|  |  |  |  |  |  | 0:00 | 8:09 |
| A4 |  | HT #2 - POLITICS |  |  |  | 0:00 | 8:09 |
| A4A | WG | A - REPORT |  |  | PROP: NEWS-PAPER | 0:20 | 8:09 |

PRINTED BY: ()  PRINT TIME: WED, JUNE 29, 2016  2:45 PM  PAGE 1 OF 12

REAL-TIME DATA UPDATES FROM A RUN DOWN SYSTEM FOR A VIDEO BROADCAST

BACKGROUND

Field of the Invention

Embodiments disclosed herein relate to video production systems. More specifically, embodiments disclosed herein relate to providing real-time data updates from a rundown system for a video broadcast.

Description of the Related Art

Conventional rundown systems are used for the scripted workflow process of video broadcasts, such as a live news program. The rundown system includes all of the objects required to broadcast a video, such as a timing schedule for each segment of the video, lighting instructions, graphics that are overlaid on the video, teleprompter text, and cue cards used by talent appearing in the video.

Because of their scope, rundown systems are accessed by multiple users, any of whom can manipulate the data for a program at any given time. Therefore, the data retrieved from the rundown systems is subject to change without notice. In many cases, therefore, users may have accessed stale data (e.g., via printed cue cards, generated graphical user interfaces, and the like). This problem is exacerbated during live video broadcasts, where users have little opportunity to determine that changes have been made.

SUMMARY

In one embodiment, a method comprises providing rundown data for a live video broadcast in a rundown system, transmitting the rundown data to a first device, wherein the rundown data is outputted based on a format template for the first device, determining that the rundown data for the live video broadcast has been modified in the rundown system, transmitting the modified rundown data to the first device, and outputting the modified rundown data via the first device and based on the format template for the first device.

In another embodiment, a computer program product comprises a computer-readable storage medium having computer-readable program code embodied therewith, the computer-readable program code executable by a processor to perform an operation comprising providing rundown data for a live video broadcast in a rundown system, transmitting the rundown data to a first device, wherein the rundown data is outputted based on a format template for the first device, determining that the rundown data for the live video broadcast has been modified in the rundown system, transmitting the modified rundown data to the first device, and outputting the modified rundown data via the first device and based on the format template for the first device.

In another embodiment, a system comprises one or more processors and a memory containing a program which when executed by the processors performs an operation comprising providing rundown data for a live video broadcast in a rundown system, transmitting the rundown data to a first device, wherein the rundown data is outputted based on a format template for the first device, determining that the rundown data for the live video broadcast has been modified in the rundown system, transmitting the modified rundown data to the first device, and outputting the modified rundown data via the first device and based on the format template for the first device.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 2 illustrates a portion of an example rundown for a video broadcast, according to one embodiment.

FIG. 3 illustrates a graphical user interface to modify data in a rundown system, according to one embodiment.

DETAILED DESCRIPTION

Embodiments disclosed herein provide techniques to provide accurate real-time data from a rundown system for use in a video broadcast. While users may manipulate the data in the rundown system at any time, embodiments disclosed herein provide accurate data to a variety of different users via a variety of different devices based on user-defined templates. For example, a news anchor may prepare a series of questions to ask an on-air guest during a live news broadcast, which are stored in the rundown system. The news anchor may prefer to have the questions printed on cue cards, or displayed on a tablet computer, with a specified formatting, font, and other characteristics as defined in a corresponding user profile. However, during the live news broadcast, the director may modify one or more questions prepared by the news anchor to remove sensitive information from the questions. In response, embodiments disclosed herein may push the updated questions to a printer which prints the updated cue cards, and/or push the updated questions to the tablet computer for display. As such, the news anchor may have access to the most current set of questions from the rundown system. Additionally, the news anchor may make their own subsequent edits to the questions and have these edits pushed back to the rundown system, as the content traffic is bi-directional.

Figure 1:
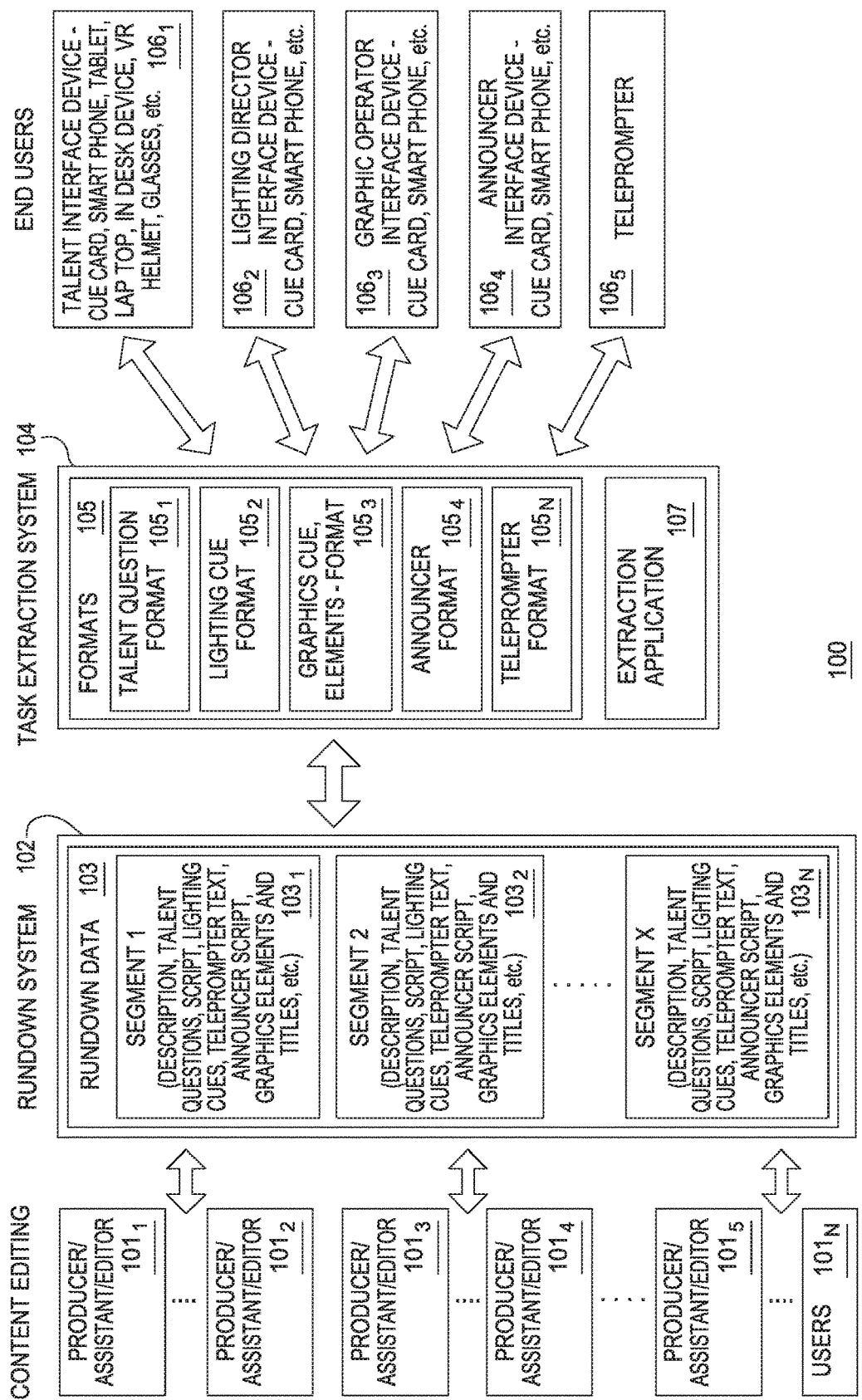
FIG. 1 illustrates a system which provides real-time data updates from a rundown system for a video broadcast, according to one embodiment.

FIG. 1 illustrates a system 100 which provides real-time data for a video broadcast from a rundown system, according to one embodiment. As shown, the system 100 includes a rundown system 102 (also referred to as a newsroom system). Generally, the rundown system 102 manages all aspects related to the production of a video broadcast (live or recorded). One example of a rundown system is Avid iNEWS® (iNEWS is a registered trademark of Avid Technologies, Inc.). As shown, the rundown system 102 stores rundown data $103_{1-N}$. The rundown data $103_{1-N}$ is any type of data that can be used in the production of a video. For example, the rundown data 103 may include, for a given video broadcast, metadata for the video broadcast, such as timing data for the video and its segments, talent questions, a script, lighting cues, teleprompter text, announcer scripts, graphics elements, and the like. Each element of rundown data 103 may correspond to a single video, or components of a video. For example, rundown data $103_{1,2}$ may correspond to the first two segments of a news program, while rundown data $103_N$ may store rundown data for an entire sitcom.

As shown, a plurality of different users $101_{1-N}$ may access the rundown system 102 to view, modify, add, or delete data from the rundown data 103. The example users $101_{1-N}$ include any type of user, including, without limitation, producers, assistants, editors, anchors, technical staff. For example, a lighting director may add information to the rundown data 103 reflecting a lighting scheme for each of a plurality of scenes of a live comedy program. However, the users $101_{1-N}$ may manipulate the rundown data 103 at any given time.

As shown, the system 104 includes a task extraction system 104. The task extraction system 104 includes a plurality of format templates $105_{1-N}$ and an extraction application. The format templates $105_{1-N}$ are user-defined (or system default) templates that specify, for a corresponding user (or class of users), metadata including preferred output devices, formatting, fonts, and the like. The format templates 105 for a given user may be specific to an output device 106. For example, a single user may have a first format template $105_1$ for a tablet device $106_1$, and a second format template $105_2$ for a smartphone device $106_2$, and so on. Doing so allows the user to specify different formatting parameters for each device, such that the user can view the rundown data 103 in a preferred format on each device. The extraction application 107 is configured to extract rundown data 103 from the rundown system 102, and provide the extracted rundown data 103 to the output devices $106_{1-N}$. The output devices $106_{1-N}$ are representative of any type of output device, including printers (which output printed cue cards), smart phones, tablet computers, teleprompters, laptop computers, desktop computers, virtual reality helmets, optical head-mounted displays in the shape of eyeglasses, and the like. The output devices $106_{1-N}$ may be used by any number of different users, such as on-screen talent (e.g., actors, news anchors, and the like), lighting directors, graphic operators, announcers, and the like.

FIG. 2 illustrates a portion of an example rundown 200 for a video broadcast, according to one embodiment. Generally, the rundown 200 is a portion of rundown data 103 for an example news program. As shown, the rundown 200 includes a plurality of example metadata columns 201-208 for the video broadcast. For example, column 201 corresponds to a program segment, while column 202 indicates which on-air talent (e.g., an actress) is included in the segment, and column 203 describes events in each segment of the video broadcast. Generally, a segment is a unit of a video broadcast, which may be defined by a unit of time, a scene, and the like. Column 205 is a metadata column used to describe the audio background music for one or more audio operators. Column 206 is a notes section for the broadcast, typically for director comments. Column 207 reflects a time duration for the segment (or portion thereof), while column 208 reflects a cumulative time for the video broadcast to that point in the video broadcast.

Generally, any number of users may modify the data in the rundown 200, which is stored in the rundown data 103. For example, a user may change the music in column 205 to a different song during the "host walk out" segment of a live broadcast. If a user who is responsible for playing the correct song has stale data, the incorrect song may be played during the live broadcast. However, the extraction application 107 may be registered to receive database triggers from the rundown system 102 when the data in the rundown data 103 is changed, deleted, or added. As such, the extraction application 107 may push a notification to the device of the user responsible for playing the correct songs during the live broadcast, allowing the user to play the correct songs during the live broadcast.

Figure 3:
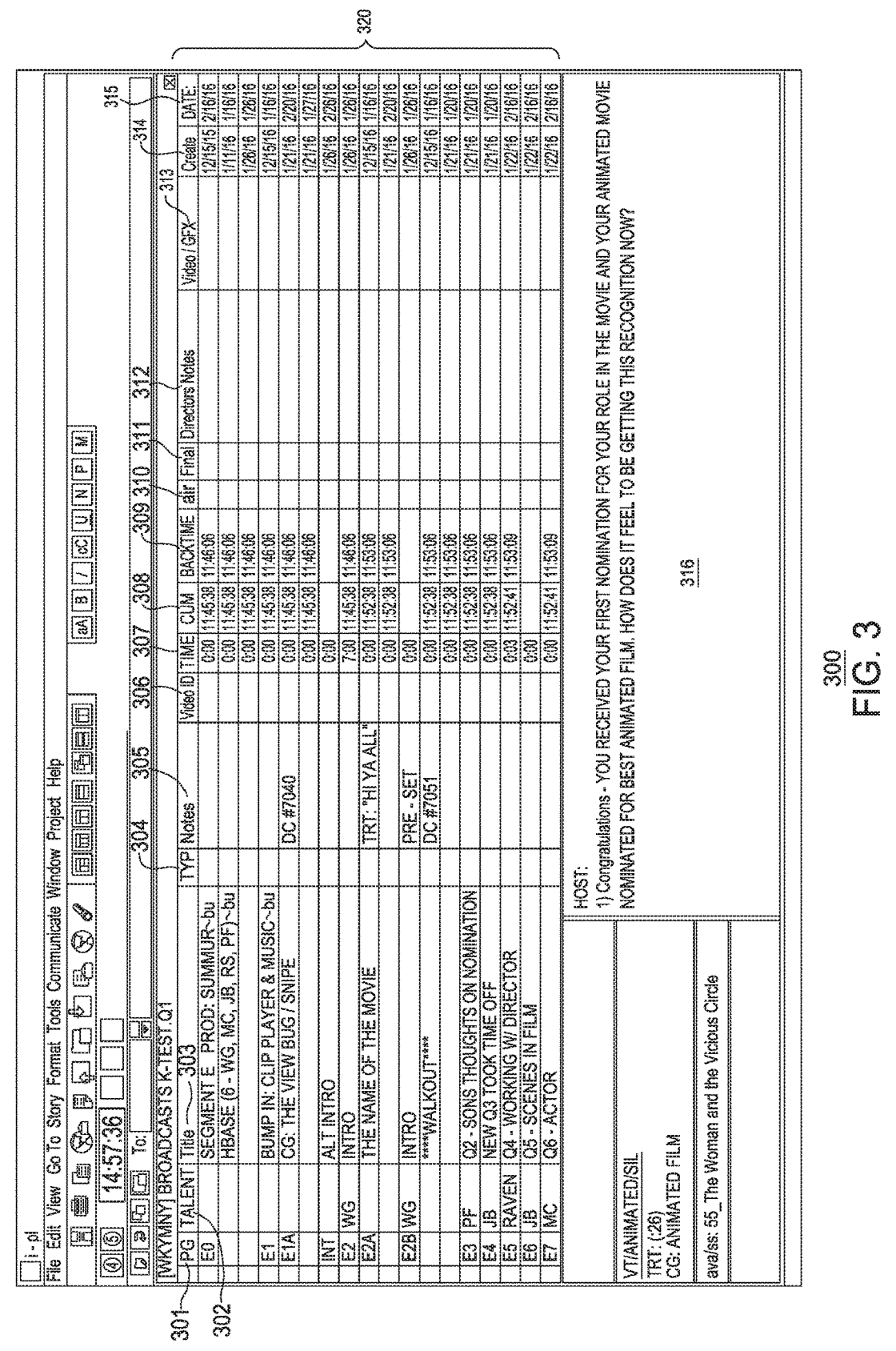

FIG. 3 illustrates a graphical user interface 300 (GUI) used to modify rundown data 103 in the rundown system 102, according to one embodiment. As shown, the graphical user interface 300 includes a table 320. The table 320 includes a plurality of columns 301-315 for metadata attributes for each of a plurality of segments of a video broadcast. For example, as shown, the table 320 includes a program segment column 301, a talent column 302, a title column 303, a type column 304, a notes column 305, a video ID column 306, a time column 307, a cumulative time column 308, a backtime column 309, an air column 310, a final column 311, a director's notes column 312, a video/graphics column 313, a create date column 314, and a date column 315.

The segment column 301 (which may correspond to column 201 of FIG. 2) reflects one of a plurality of segments of the video broadcast. The talent column 302 (which may correspond to column 202 of FIG. 2) reflects one or more individuals who appear in the segment. The title column 303 may specify a respective title of each segment (where applicable). The type column 304 is an optional column that may be used to define a type of each segment. The notes column 305 (which may correspond to column 206 of FIG. 2) is used to store notes or other metadata for the segment. The video ID column 306 is used to store an identifier for a video that may be displayed during the video broadcast (e.g., a movie clip, a sporting highlight clip, and the like). The time column 307 reflects a respective time duration of each segment. The cumulative time column 308 reflects a cumulative time of the video broadcast at each segment. The backtime column 309 reflects a time correction needed, while the air column 310 and final column 311 reflect the actual time allotted for the video broadcast. If the cumulative time 308 for the video broadcast does not match the time allocated for the broadcast (e.g., the air column 310 and/or final column 311), another video broadcast element may be inserted downstream (e.g., a commercial or other promotion). The directors notes column 312 is a column where a director can enter notes for each segment, while the video/graphics column 313 is used to describe what video or other graphics should be overlaid on the video broadcast. The create column 314 reflects a time when each row of data was created, while the date column 315 reflects a date when the corresponding row was last updated.

As shown, the GUI 300 includes an editor field 316. When a user selects a field in the table 320, the contents of the field are presented in the editor field 316. Users may add, delete, or otherwise modify the data in the selected field using the editor field 316. In response, a database trigger in the rundown system 102 may notify the extraction application 107 of the change in the rundown data 103. Similarly, the GUI 300 may generate a notification that is transmitted to the extraction application 107. Because users can modify the data at any time, the extraction application 107 is configured to notify users of any relevant changes to their data, and present the modified data in a format specified by the user's respective format template 105.

Figure 4A:
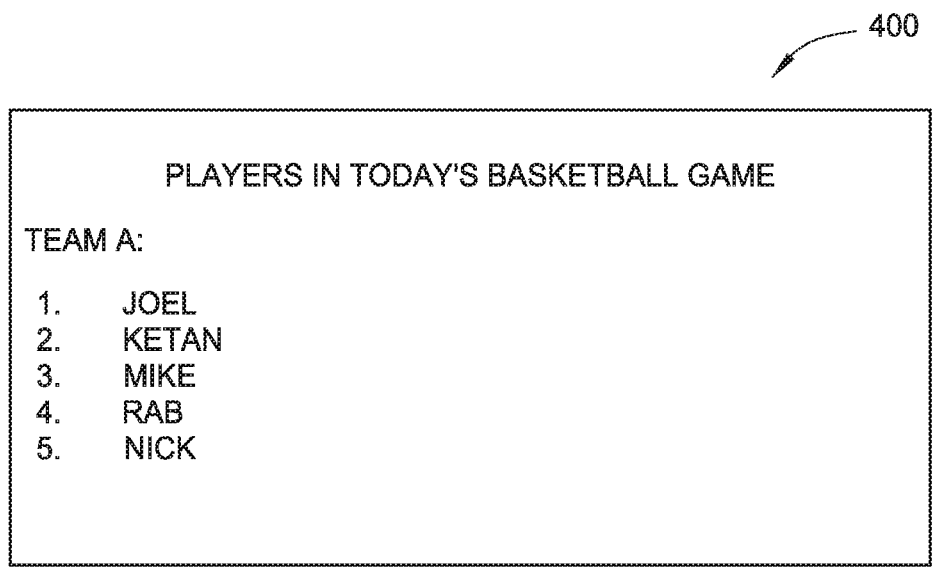
FIGS. 4A-4B illustrate example graphical user interfaces created by extracting real-time data from a rundown system, according to various embodiments.

FIG. 4A illustrates an example GUI 400 created by extracting real-time data from a rundown system, according to one embodiment. The GUI 400 is one example of an output generated based on the rundown data 103 in the rundown system 102 and the format templates 105 associated with one or more users and an end user device 106. Therefore, the GUI 400 may be outputted on a tablet computer, smart phone, desktop monitor, teleprompter, or other digital display device. Similarly, the contents of the GUI 400 may be printed by a printer.

As shown, the GUI 400 reflects the players of an example basketball team, Team A. The GUI 400 may have been generated prior to the start of the basketball game, such that the on-air announcers and other production staff are aware of the players participating in the game. Doing so allows these users to conduct research on each player, prepare notes about each player, and otherwise prepare for the broadcast of the basketball game. The data reflecting the players for Team A is stored as rundown data 103 associated with the video broadcast of the basketball game in the rundown system 102. As shown in GUI 400, the members of Team A are "Joel," "Ketan," "Mike," "Rab," and "Nick."

At some point subsequent to generation of the GUI 400, a change is made to the players in the basketball game for Team A. For example, a previously injured player may have recovered to the point where the coach of Team A believes the player can participate. Similarly, a player depicted in the GUI 400 may need a day of rest, and a different player may be substituted in the lineup. The change may be made prior to the start of the basketball game, or during the live broadcast of the basketball game. As such, the data in the GUI 400 has become stale, and a user may update the rundown data 103 in the rundown system 102 to reflect the substitution of a different player for Team A.

The extraction application 107 may detect the change in the rundown data 103. For example, the extraction application 107 may detect the change via a push notification from the rundown system 102, a trigger fired by the rundown system 102, a pull notification initiated by the extraction application 107, or by the extraction application 107 periodically polling the rundown data 103 in the rundown system 102. The extraction application 107 may then compare the received rundown data 103 to previously received copies of the rundown data 103 to detect any additions, deletions, or modifications. Responsive to the change in the rundown data 103, the extraction application 107 may identify a corresponding format template 105, and update the GUI 400 to include the real-time data in the rundown data 103.

Figure 4B:
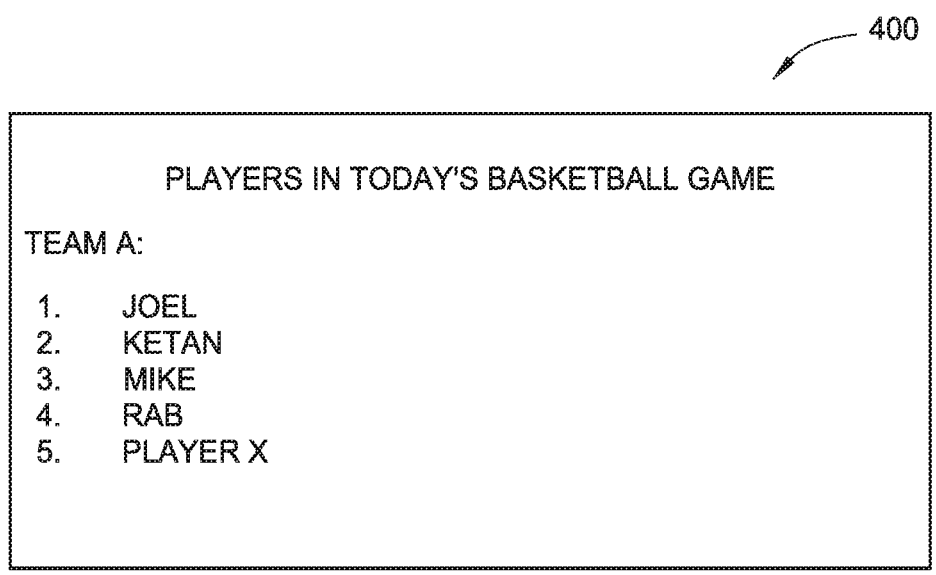

FIG. 4B reflects an updated GUI 400 depicting the players participating in the basketball game for Team A. As shown, the extraction application 107 has identified that "Player X" has replaced "Nick" in the lineup for Team A, and updated the GUI 400 to reflect the change in players. Again, the format of the GUI 400 may be based on formatting data in a format template 105 for the user and the device on which the GUI 400 is outputted (or printed, in the case of printed materials).

Figure 5A:
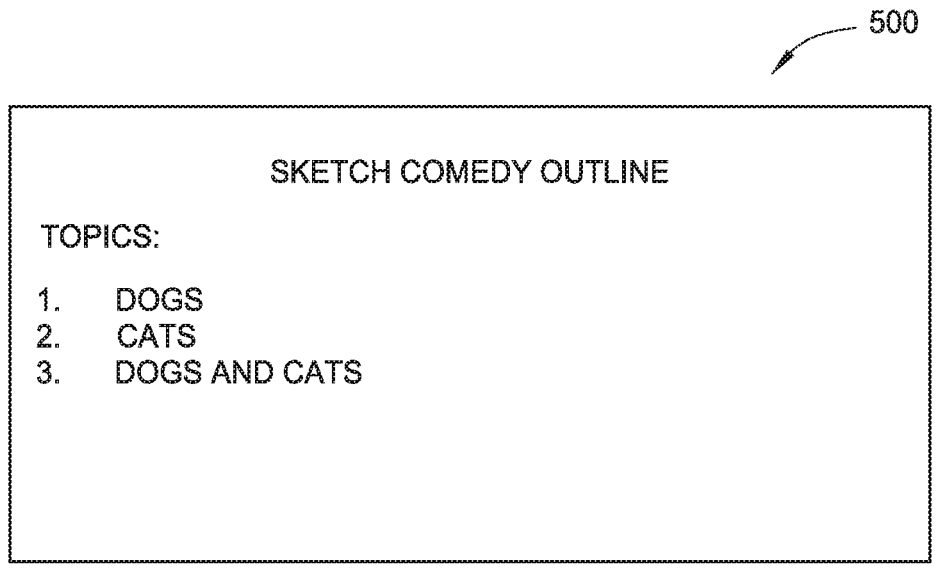
FIGS. 5A-5B illustrate examples graphical user interfaces created by real-time data from a rundown system, according to various embodiments.

FIG. 5A an example GUI 500 created by extracting real-time data from a rundown system, according to one embodiment. As shown, the GUI 500 includes a user-defined list of topics for a sketch comedy routine. A person appearing in the sketch comedy routine may prepare the topics for use during a live video broadcast of the sketch comedy routine. By storing the topics as rundown data 103 in the rundown system 102, the person may be able to view the topics during filming of the live broadcast. For example, a teleprompter, in-desk monitor, or cue cards may be used to assist the person during filming of the live broadcast, in the event the person forgets one or more of the topics depicted in the GUI 500.

As shown, the GUI 500 depicts three example topics, namely "dogs," "cats," and "dogs and cats." During the live broadcast, the person may begin the sketch comedy routine, which includes a segment about "dogs," as indicated by the topics in the GUI 500. When broadcast to the public, users around the world may express their viewpoints about the sketch comedy routine on social media platforms. In many cases, the user sentiment on social media is positive. In other cases, the user sentiment on social media is negative. As such, the extraction application 107 may include natural language processing algorithms used to identify, among other attributes, sentiment in text.

The extraction application 107 may reference social media platforms to identify posts discussing the live broadcast of the sketch comedy routine. The extraction application 107 may then analyze the identified posts to determine the overall sentiment of the social media posts. For example, the extraction application 107 may leverage natural language processing algorithms to determine that the "dogs" segment is associated with a negative user sentiment on social media platforms.

In response, the extraction application 107 may output a notification to one or more user devices 106 to reflect the negative sentiment for the "dogs" segment. In response, a user (such as a director, actor, or producer) may modify the data corresponding to the sketch comedy outline in the rundown data 103.

Figure 5B:
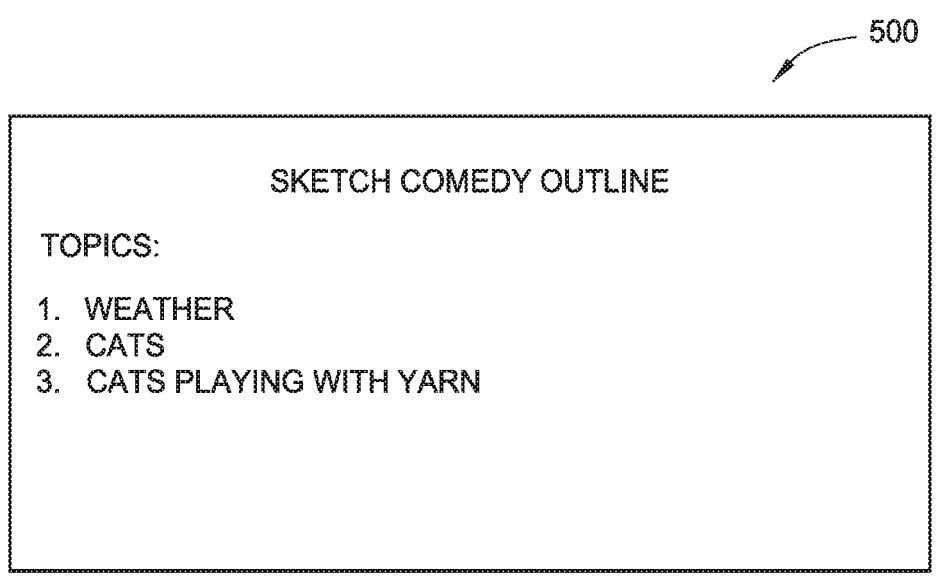

FIG. 5B depicts a modified version of the GUI 500. As shown, the GUI 500 has been modified to remove the topic "dogs" from the sketch comedy outline in response to the negative social media sentiment. Specifically, the sketch comedy outline now lists the "weather," "cats," and "cats playing with yarn" as the topics for the sketch comedy routine. In at least one embodiment, the extraction application 107 may determine that "cats" is associated with a positive social media segment, and the users may update the topics to include additional segments about cats. By providing the GUI 500, which is formatted according to the format template 105 of the actor (and the corresponding device or printout), the actor may be able to modify the comedy routine during the live broadcast to avoid further negative sentiment on social media.

Figure 6:
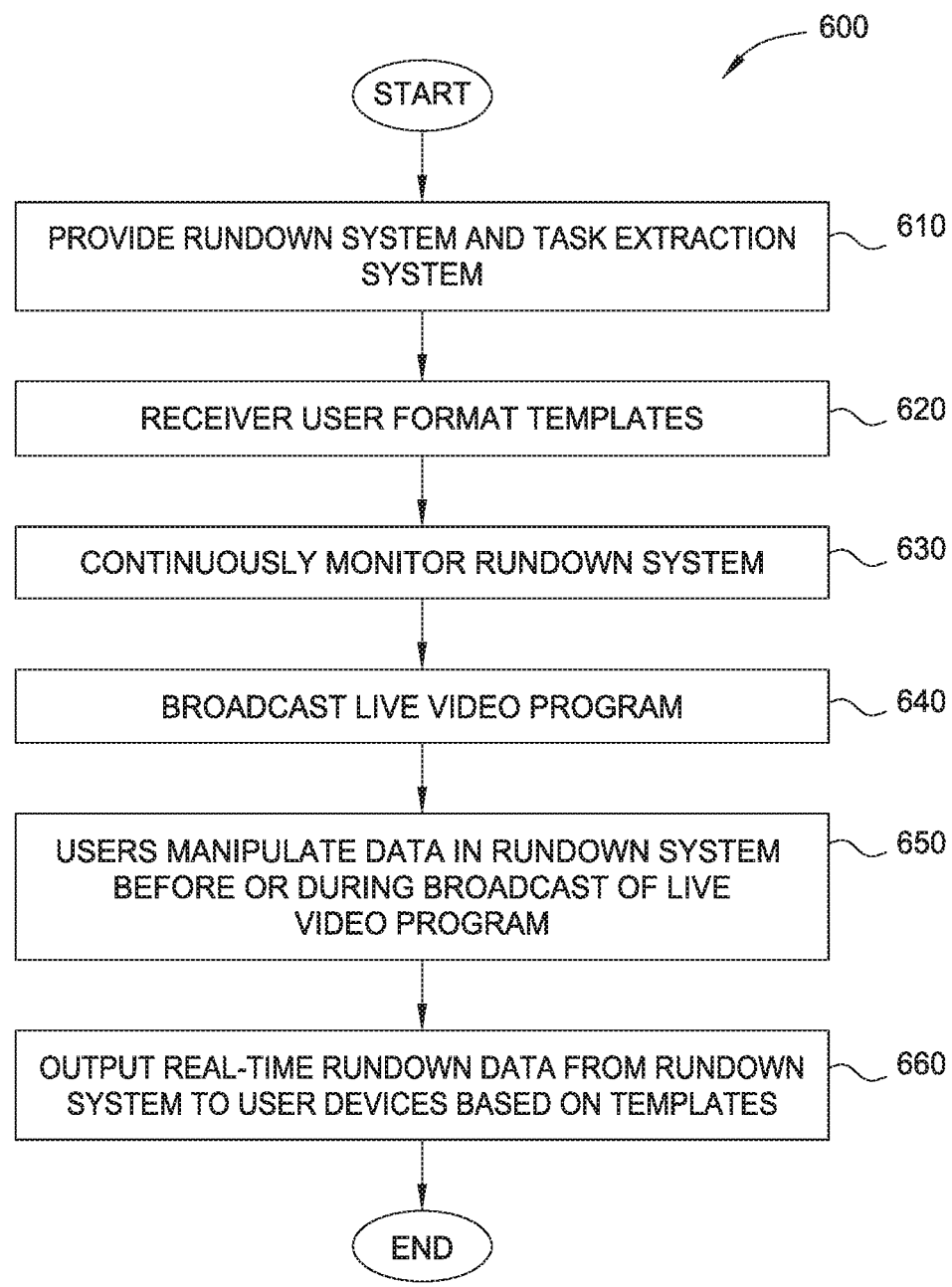
FIG. 6 is a flow chart illustrating a method to provide real-time data updates from a rundown system for a video broadcast, according to one embodiment.

FIG. 6 is a flow chart illustrating a method 600 to provide real-time data for a live video broadcast from a rundown system, according to one embodiment. As shown, the method 600 begins at block 610, where a rundown system 102 having rundown data 103 and a task extraction system 104 having the extraction application 107 are provided as part of a video production system, such as the system 100. At block 620, users may define formatting preferences in one or more format templates 105. Generally, the format templates 105 provide parameters used to render and output rundown data 103 on one or more devices 106 according to the preferences of each user.

At block 630, the extraction application 107 may continuously monitor the rundown data 103 in the rundown system 102. For example, while a live video is being broadcasted (or in the hours leading up to the start of the live broadcast), the extraction application 107 may continuously poll one or more application programming interfaces (APIs) the rundown system 102 for rundown data 103 associated with the video. The APIs of the rundown system 102 may then return the current rundown data 103 for the video. As another example, the rundown system 102 may have database triggers which notify the extraction application 107 of changes when the rundown data 103 for a video changes.

At block 640, a live video is broadcast is initiated (e.g., via the Internet, satellite, and the like). At block 650, one or more users may manipulate the rundown data 103 in the rundown system 102 for the live video broadcast. For example, lighting directors may change lighting schemes, audio producers may modify songs or other audio files played during the live broadcast, and news anchors may modify questions asked during a live news broadcast. As another example, a talk show host may arrive just before (or after) the live broadcast for the talk show is about to begin. The host may decide to edit the questions they will ask an on-air guest during a given segment of the talk show. Therefore, the rundown data 103 in the rundown system 102 is modified to reflect the newest version of the questions prepared by the talk show host.

At block 660, the extraction application 107 outputs real-time rundown data 103 from the rundown system to one or more user devices 106 based on the format templates 105 for each user. For example, the extraction application 107 may print updated cue cards for the news anchor, where the updated cue cards reflect changes to the questions made before or during the live broadcast. Similarly, the extraction application 107 may update a teleprompter 106 to reflect the most current questions after the changes made during the live broadcast. Further still, the extraction application 107 may update smartphones, tablets, or other computing devices to reflect the real-time rundown data 103 in the rundown system 102.

Figure 7:
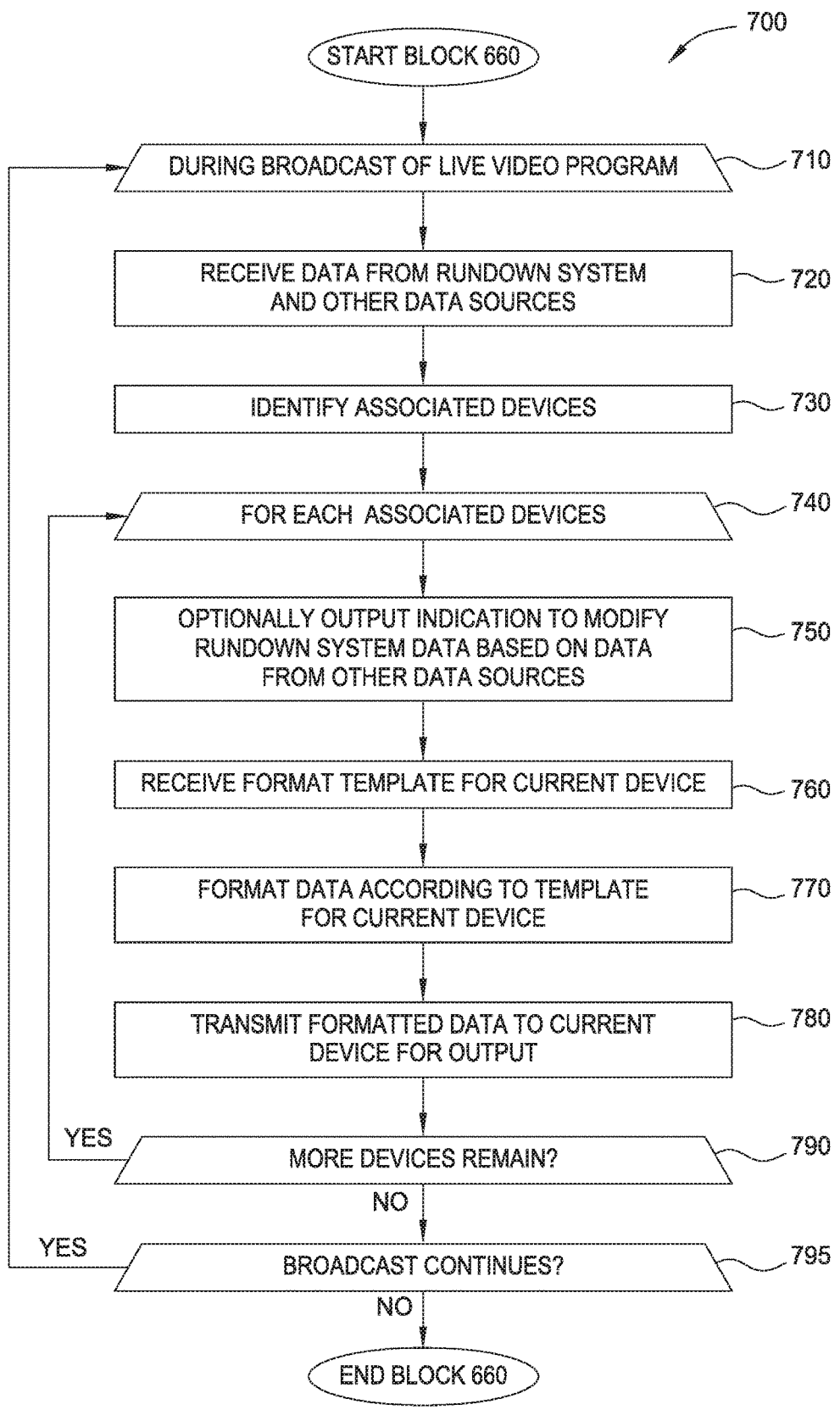
FIG. 7 is a flow chart illustrating a method to output modified content from a rundown system to user devices based on user-defined templates, according to one embodiment.

FIG. 7 is a flow chart illustrating a method 700 corresponding to block 660 to output real-time rundown data from a rundown system to user devices based on user-defined templates, according to one embodiment. As shown, the method 700 begins at block 710, where a loop including blocks 720-795 are executed during the broadcast of a live video. At block 720, the extraction application 107 may receive rundown data 103 from the rundown system 102, and data from other data sources. The data from other data sources may include data from social media platforms, news websites, and other sources of viewer sentiment data. At block 730, the extraction application 107 may identify the devices 106 that are associated with the received rundown data 103. For example, a user who inputs a script for the live broadcast as rundown data 103 may associate the script with all actors and support staff involved with the live broadcast. As such, the extraction application 107 may identify the associated users, and identify their associated devices 106. In one embodiment, the associated devices are identified by associations in the format templates 105 of each user.

At block 740, the extraction application 107 executes a loop including blocks 750-790 for each associated device 106 identified at block 730. At block 750, the extraction application 107 may optionally generate and output an indication to modify rundown data 103 in the rundown system 102 based on the data received from other data sources at block 720. For example, if social media sentiment indicates users have a positive sentiment for a news segment, the extraction application 107 may output an indication to the producer and/or director of the live news program that the current news segment is particularly appealing to viewers. As such, the users may modify the news program to include more of the current news segment, and update the rundown data 103 to reflect the changes.

At block 760, the extraction application 107 receives the format template 105 for the current device 106. At block 770, the extraction application 107 formats the rundown data 103 according to the format template 105 for the current device 106. For example, the format template 105 may specify highlighting, fonts, line spacing, and other formatting parameters for a given device 106. As such, the extraction application 107 may format the rundown data 103 for the device 106 accordingly. At block 780, the extraction application 107 transmits the formatted rundown data 103 to the current device for output. At block 790, the extraction application 107 determines whether more devices remain. If more devices remain, the extraction application 107 returns to block 740, otherwise, the extraction application 107 proceeds to block 795. At block 795, the extraction application 107 determines whether the live broadcast is continuing or has ended. If the live broadcast continues, the extraction application 107 returns to block 710. If the live broadcast has ended, the method 700 ends.

Figure 8:
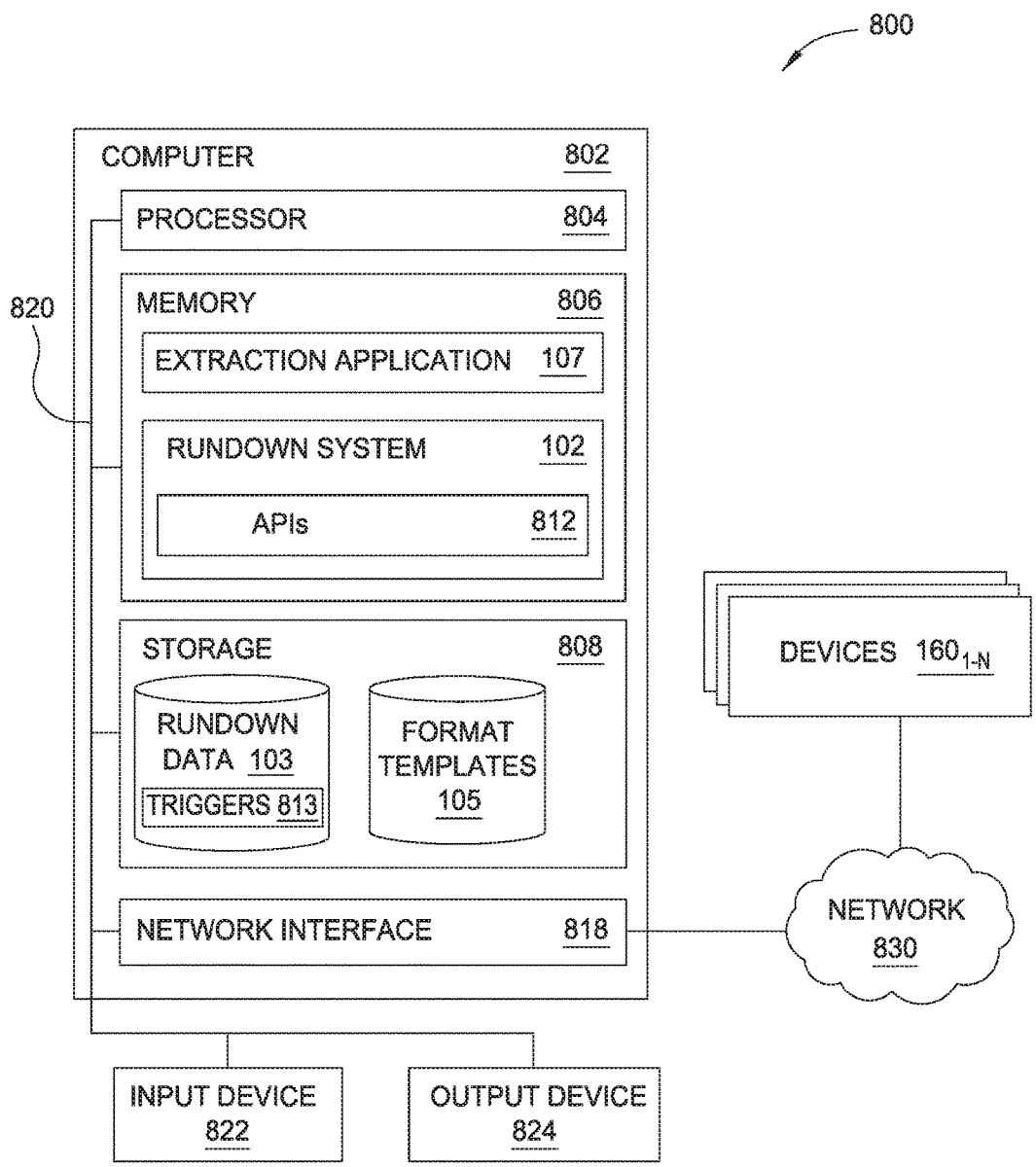
FIG. 8 is a block diagram illustrating an example system which provides real-time data updates from a rundown system for a video broadcast, according to one embodiment.

FIG. 8 is a block diagram illustrating an example system 800 which provides real-time data for a video broadcast from a rundown system, according to one embodiment. The networked system 800 includes a computer 802. The computer 802 may also be connected to other computers and the devices 106 via a network 830. In general, the network 830 may be a telecommunications network and/or a wide area network (WAN). In a particular embodiment, the network 830 is the Internet.

The computer 802 generally includes a processor 804 which obtains instructions and data via a bus 820 from a memory 806 and/or a storage 808. The computer 802 may also include one or more network interface devices 818, input devices 822, and output devices 824 connected to the bus 820. The computer 802 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 804 is a programmable logic device that performs instruction, logic, and mathematical processing, and may be representative of one or more CPUs. The network interface device 818 may be any type of network communications device allowing the computer 802 to communicate with other computers via the network 830.

The storage 808 is representative of hard-disk drives, solid state drives, flash memory devices, optical media and the like. Generally, the storage 808 stores application programs and data for use by the computer 802. In addition, the memory 806 and the storage 808 may be considered to include memory physically located elsewhere; for example, on another computer coupled to the computer 802 via the bus 820.

The input device 822 may be any device for providing input to the computer 802. For example, a keyboard and/or a mouse may be used. The input device 822 represents a wide variety of input devices, including keyboards, mice, controllers, and so on. Furthermore, the input device 822 may include a set of buttons, switches or other physical device mechanisms for controlling the computer 802. The output device 824 may include output devices such as monitors, touch screen displays, and so on.

As shown, the memory 806 contains the rundown system 102 and the extraction application 107, each described in greater detail above. As shown, the rundown system 102 provides a set of APIs 812 that include APIs to facilitate communication with the extraction application 107. For example, the APIs 812 include APIs to receive requests for rundown data 103 from the extraction application 107, APIs to transmit rundown data 103 to the extraction application 107 (and/or the devices 106), and the like. In at least one embodiment, the extraction application 107 is a component of the rundown system 102.

As shown, the storage 808 contains the rundown data 103 and the format templates 105, each described in greater detail above. As shown, the rundown data 103 includes database triggers 813. Generally, whenever data is added, deleted, or otherwise modified in the rundown data 103, the triggers 813 may transmit a corresponding indication to the extraction application 107. Doing so allows the extraction application 107 to provide formatted, real-time rundown data 103 to the devices 106 during a live video broadcast. However, designated components of the rundown data 103 and/or the rundown system 102 may detect changes in the rundown data 103, and transmit a corresponding indication to the extraction application 107 and/or devices 106$_{1-N}$. For example, the rundown system 102 may compare the values stored in the rundown data 103 to detect changes.

As previously indicated, the extraction application 107 may operate in a push or pull mode, where the extraction application 107 requests rundown data 103 from one or more APIs 812 in the pull mode. In the push mode, the APIs 812 may push current rundown data 103 to the extraction application 107. In either mode, the extraction application 107, the rundown system 102, and/or the rundown data 103 may determine whether a change has been made to the rundown data 103 (e.g., comparing timestamp values for the relevant rundown data 103, reviewing update logs reflecting updates to the rundown data 103, and the like).

Advantageously, embodiments disclosed herein provide real-time rundown data stored in rundown systems to a plurality of different devices during a live (or recorded) video broadcast. Because the rundown data 103 may be changed at any given time, the extraction application 107 may ensure that all user devices 106 receive the most current rundown data 103, even during a live video broadcast.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the extraction application 107 could execute on a computing system in the cloud and provide real-time rundown data to a plurality of devices in the cloud based on the format template data 105 for each user and user device. In such a case, the extraction application 107 could store the format template data 105 at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   extracting, using an extraction application, rundown data for a live video broadcast from a rundown system;
   identifying a plurality of devices associated with the rundown data;
   receiving a plurality of format templates associated with the plurality of devices, each format template associated with (i) an output type of a device of the plurality of devices, and (ii) a role of a user of the device;
   formatting, using the extraction application, the rundown data for the plurality of devices using the plurality of format templates;
   transmitting, using the extraction application, the formatted rundown data to the plurality of devices;
   receiving, at the extraction application, a signal from the rundown system indicating that the rundown data for the live video broadcast has been modified in the rundown system;
   receiving, at the extraction application, external data from a source other than the rundown system, the external data relating to user sentiment for the live video broadcast;
   extracting, using the extraction application, modified rundown data from a rundown system;
   transmitting, using the extraction application, the modified rundown data and an indication related to the external data to the plurality of devices; and
   outputting the modified rundown data via a first device of the plurality of devices.

2. The method of claim 1, wherein the format template of the first device comprises at least one user-specified formatting rule for outputting the rundown data and the modified rundown data on the first device based on the output type of the first device, wherein the source other than the rundown system comprises a plurality of social media platforms, and wherein the external data comprises social media broadcasts published by a plurality of users, the method further comprising:
   identifying, based on a natural language processing algorithm applied to a text of the social media broadcasts, a sentiment of the data from the plurality of social media platforms; and outputting an indication of the identified sentiment via one or more of the rundown system and the first device.

3. The method of claim 1, further comprising:
determining, by the extraction application, that the rundown data for the live video broadcast has been modified by one or more of: (i) detecting, at the extraction application, a database trigger from the rundown system, (ii) receiving, at the extraction application, a push notification from the rundown system, and (iii) transmitting, from the extraction application, a pull notification to the rundown system.

4. The method of claim 1, wherein each of the plurality of devices is associated with at least one format template associated with a role of a user of the respective device and an output type of the respective device, wherein the modified rundown data is formatted according to the respective format template for each device of the plurality of devices, wherein the formatted modified rundown data is outputted on each device of the plurality of devices during the live video broadcast, the method further comprising:
transmitting the modified rundown data to a second device of the plurality of devices, wherein the user of the first device is the user of the second device;
identifying a format template for the second device, different than the format template of the first device, wherein the format template for the second device is based on the role of the user of the first and second devices and the output type of the second device; and
outputting the modified rundown data via the second device based on the format template for the second device and the output type of the second device.

5. The method of claim 4, wherein the plurality of output types further comprise: (i) a digital visual output, and (ii) a printed output, wherein the plurality of devices comprise: (i) a tablet computer, (ii) a laptop computer, (iii) a teleprompter, (iv) a smart phone, (v) a printer configured to print cue cards, (vi) a virtual reality helmet, (vii) optical head-mounted displays, and (viii) a monitor.

6. The method of claim 5, wherein outputting the modified rundown data on the plurality of devices further comprises:
identifying the modified rundown data for the live video broadcast in the rundown system;
determining that the plurality of devices are associated with the rundown data for the live video broadcast;
identifying the at least one format template for each of the plurality of devices based on the output type of each device;
formatting, for each of the plurality of devices, the modified rundown data for the live video broadcast according to the respective at least one format template and the output type of each device; and
transmitting the formatted, modified rundown data for the live video broadcast to each respective device.

7. The method of claim 6, wherein each of a plurality of users access the rundown data in the rundown system, wherein each of the plurality of users have permissions to modify the rundown data in the rundown system, wherein modification of the rundown data in the rundown system by one of the plurality of users generates database trigger specifying that the data in the rundown system has been modified, thereby facilitating the output of the modified rundown data during the live video broadcast.

8. A computer program product, comprising:
a non-transitory computer-readable storage medium having computer-readable program code embodied therewith, the computer-readable program code executable by a processor to perform an operation comprising:
extracting, using an extraction application, rundown data for a live video broadcast from a rundown system;
identifying a plurality of devices associated with the rundown data;
receiving a plurality of format templates associated with the plurality of devices, each format template associated with (i) an output type of a device of the plurality of devices, and (ii) a role of a user of the device;
formatting, using the extraction application, the rundown data for the plurality of devices using the plurality of format templates;
transmitting, using the extraction application, the formatted rundown data to the plurality of devices;
receiving, at the extraction application, a signal from the rundown system indicating that the rundown data for the live video broadcast has been modified in the rundown system;
receiving, at the extraction application, external data from a source other than the rundown system, the external data relating to user sentiment for the live video broadcast;
extracting, using the extraction application, modified rundown data from a rundown system;
transmitting, using the extraction application, the modified rundown data and an indication related to the external data to the plurality of devices; and
outputting the modified rundown data via a first device of the plurality of devices.

9. The computer program product of claim 8, wherein the format template of the first device comprises at least one user-specified formatting rule for outputting the rundown data and the modified rundown data on the first device based on the output type of the first device, wherein the source other than the rundown system comprises a plurality of social media platforms, and wherein the external data comprises social media broadcasts published by a plurality of users, the operation further comprising:
receiving data from a plurality of social media platforms, wherein the data comprises social media broadcasts published by a plurality of users;
identifying, based on a natural language processing algorithm applied to a text of the social media broadcasts, a sentiment of the data from the plurality of social media platforms; and
outputting an indication of the identified sentiment via one or more of the rundown system and the first device.

10. The computer program product of claim 8, the operation further comprising:
determining, by the extraction application, that the rundown data for the live video broadcast has been modified by one or more of: (i) detecting, at the extraction application, a database trigger from the rundown system, (ii) receiving, at the extraction application, a push notification from the rundown system, and (iii) transmitting, from the extraction application, a pull notification to the rundown system.

11. The computer program product of claim 8, wherein each of the plurality of devices is associated with at least one format template associated with a role of a user of the respective device and an output type of the respective device, wherein the modified rundown data is formatted according to the respective format template for each device of the plurality of devices, wherein the formatted modified rundown data is outputted on each device of the plurality of devices during the live video broadcast, the operation further comprising:
- transmitting the modified rundown data to a second device of the plurality of devices, wherein the user of the first device is the user of the second device;
- identifying a format template for the second device, different than the format template of the first device, wherein the format template for the second device is based on the role of the user of the first and second devices and the output type of the second device; and
- outputting the modified rundown data via the second device based on the format template for the second device and the output type of the second device.

12. The computer program product of claim 11, wherein the output type comprises one or more of a digital output and a printed output, wherein the plurality of devices comprise: (i) a tablet computer, (ii) a laptop computer, (iii) a teleprompter, (iv) a smart phone, (v) a printer configured to print cue cards, (vi) a virtual reality helmet, (vii) optical head-mounted displays, and (viii) a monitor.

13. The computer program product of claim 12, wherein outputting the modified rundown data on the plurality of devices further comprises:
- identifying the modified rundown data for the live video broadcast in the rundown system;
- determining that the plurality of devices are associated with the rundown data for the live video broadcast;
- identifying the at least one format template for each of the plurality of devices based on the output type of each device;
- formatting, for each of the plurality of devices, the modified rundown data for the live video broadcast according to the respective at least one format template and the output type of each device; and
- transmitting the formatted, modified rundown data for the live video broadcast to each respective device.

14. The computer program product of claim 13, wherein each of a plurality of users access the rundown data in the rundown system, wherein each of the plurality of users have permissions to modify the rundown data in the rundown system, wherein modification of the rundown data in the rundown system by one of the plurality of users generates database trigger specifying that the data in the rundown system has been modified, thereby facilitating the output of the modified rundown data during the live video broadcast.

15. A system, comprising:
- one or more computer processors; and
- a memory containing a program which when executed by the processors performs an operation comprising:
  - extracting, using an extraction application, rundown data for a live video broadcast from a rundown system;
  - identifying a plurality of devices associated with the rundown data;
  - receiving a plurality of format templates associated with the plurality of devices, each format template associated with (i) an output type of a device of the plurality of devices, and (ii) a role of a user of the device;
  - formatting, using the extraction application, the rundown data for the plurality of devices using the plurality of format templates;
  - transmitting, using the extraction application, the formatted rundown data to the plurality of devices;
  - receiving, at the extraction application, a signal from the rundown system indicating that the rundown data for the live video broadcast has been modified in the rundown system;
  - receiving, at the extraction application, external data from a source other than the rundown system, the external data relating to user sentiment for the live video broadcast;
  - extracting, using the extraction application, modified rundown data from a rundown system;
  - transmitting, using the extraction application, the modified rundown data and an indication related to the external data to the plurality of devices; and
  - outputting the modified rundown data via a first device of the plurality of devices.

16. The system of claim 15, wherein the format template of the first device comprises at least one user-specified formatting rule for outputting the rundown data and the modified rundown data on the first device based on the output type of the first device, wherein the source other than the rundown system comprises a plurality of social media platforms, and wherein the external data comprises social media broadcasts published by a plurality of users, the operation further comprising:
- receiving data from a plurality of social media platforms, wherein the data comprises social media broadcasts published by a plurality of users;
- identifying, based on a natural language processing algorithm applied to a text of the social media broadcasts, a sentiment of the data from the plurality of social media platforms; and
- outputting an indication of the identified sentiment via one or more of the rundown system and the first device.

17. The system of claim 15, the operation further comprising:
- determining, by the extraction application, that the rundown data for the live video broadcast has been modified by one or more of: (i) detecting, at the extraction application, a database trigger from the rundown system, (ii) receiving, at the extraction application, a push notification from the rundown system, and (iii) transmitting, from the extraction application, a pull notification to the rundown system.

18. The system of claim 15, wherein each of the plurality of devices is associated with at least one format template associated with a role of a user of the respective device and an output type of the respective device, wherein the modified rundown data is formatted according to the respective format template for each device of the plurality of devices, wherein the formatted modified rundown data is outputted on each device of the plurality of devices during the live video broadcast, the operation further comprising:
- transmitting the modified rundown data to a second device of the plurality of devices, wherein the user of the first device is the user of the second device;
- identifying a format template for the second device, different than the format template of the first device, wherein the format template for the second device is based on the role of the user of the first and second devices and the output type of the second device; and
- outputting the modified rundown data via the second device based on the format template for the second device and the output type of the second device.

19. The system of claim 18, wherein the output type comprises one or more of a digital output and a printed output, wherein the plurality of devices comprise: (i) a tablet computer, (ii) a laptop computer, (iii) a teleprompter, (iv) a smart phone, (v) a printer configured to print cue cards, (vi) a virtual reality helmet, (vii) optical head-mounted displays, and (viii) a monitor.

20. The system of claim 19, wherein outputting the modified rundown data on the plurality of devices further comprises:
   identifying the modified rundown data for the live video broadcast in the rundown system;
   determining that the plurality of devices are associated with the rundown data for the live video broadcast;
   identifying the at least one format template for each of the plurality of devices based on the output type of each device;
   formatting, for each of the plurality of devices, the modified rundown data for the live video broadcast according to the respective at least one format template and the output type of each device; and
   transmitting the formatted, modified rundown data for the live video broadcast to each respective device.

* * * * *